July 26, 1949.　　　　　A. A. VOLK　　　　　2,477,022
OPTICAL SIGNAL FOR AUTOMOBILES AND THE LIKE
Filed Feb. 21, 1947　　　　　　　　　　　　　　3 Sheets-Sheet 1
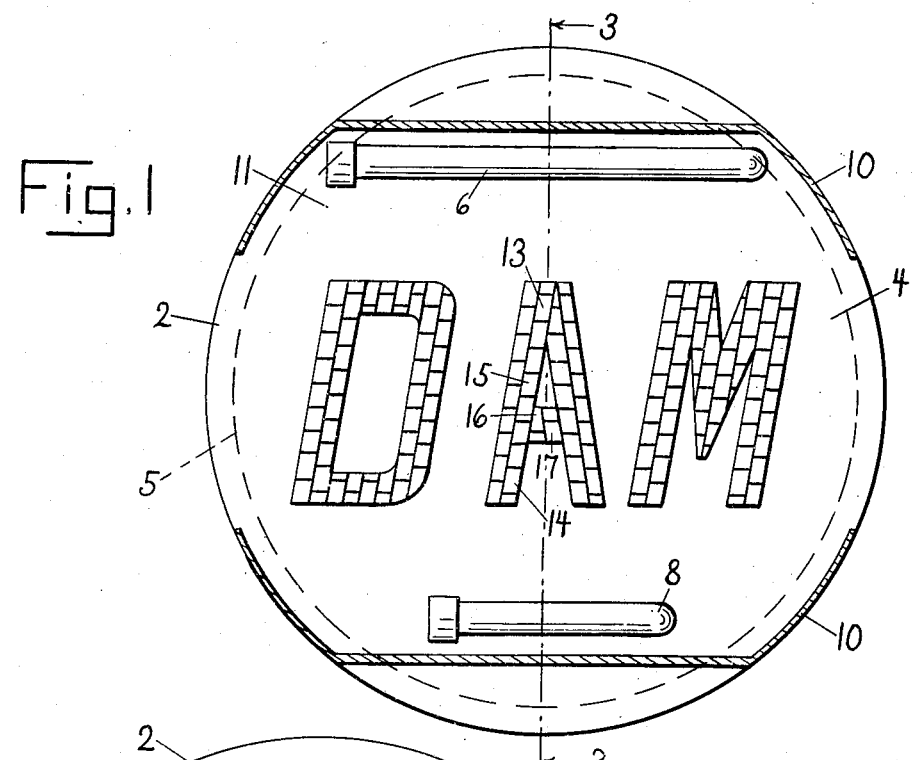
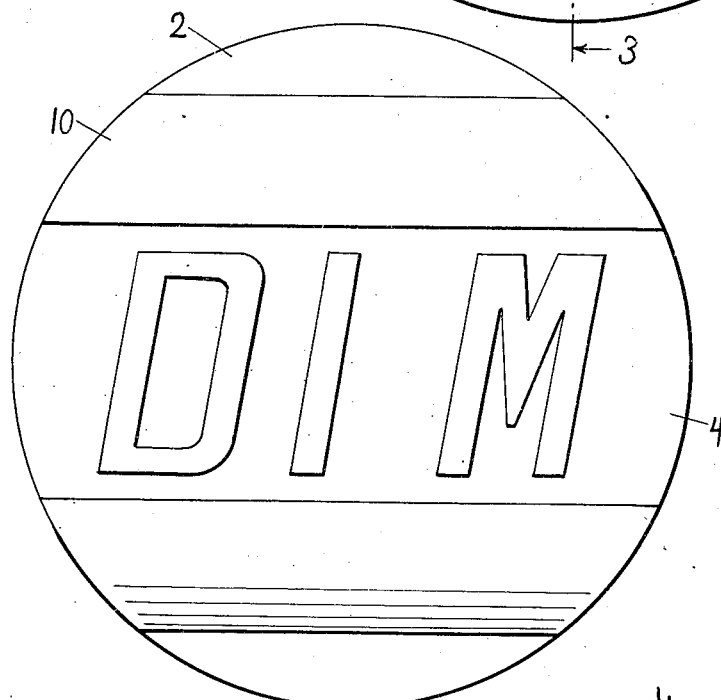
INVENTOR:
ALBERT A. VOLK
BY
ATTORNEY July 26, 1949. A. A. VOLK 2,477,022
OPTICAL SIGNAL FOR AUTOMOBILES AND THE LIKE
Filed Feb. 21, 1947 3 Sheets-Sheet 2
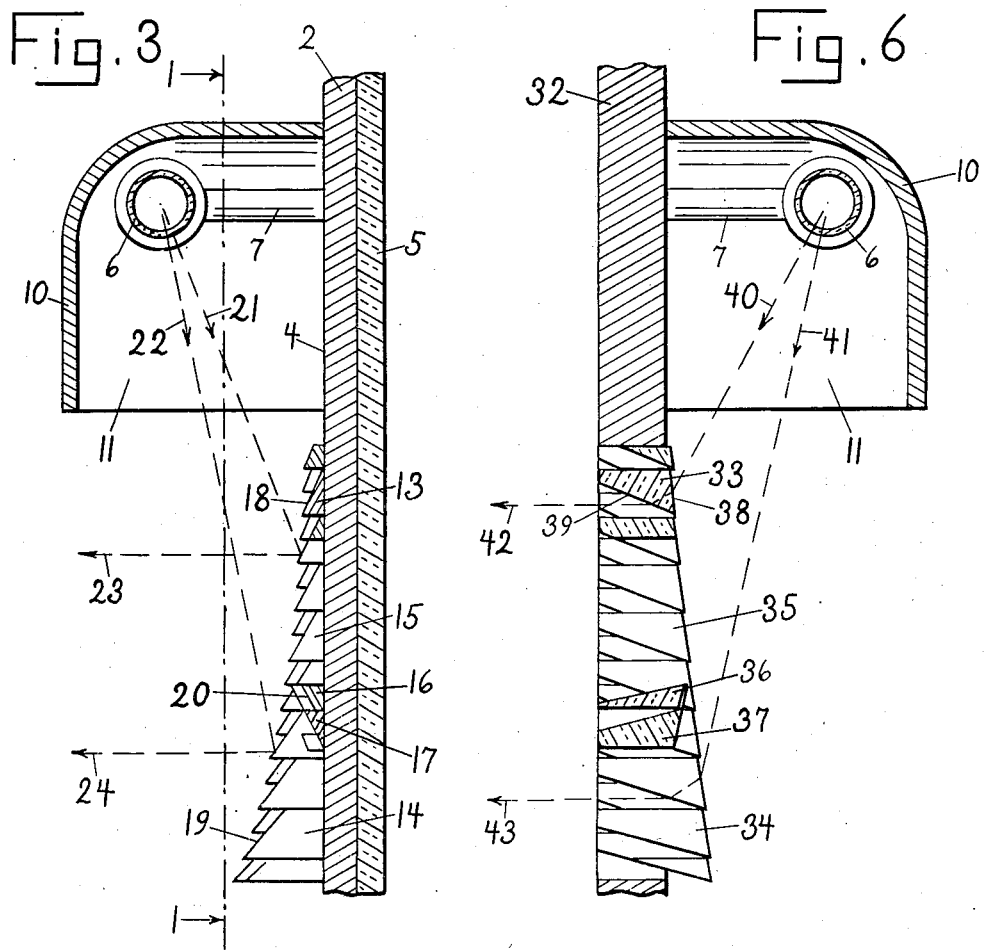
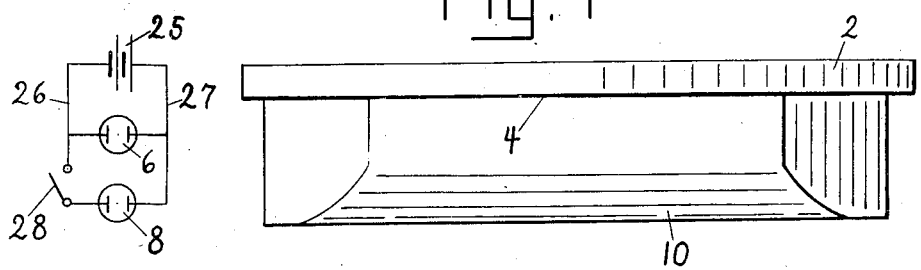
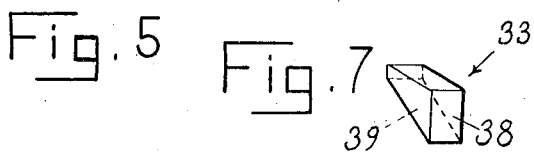
INVENTOR:
ALBERT A. VOLK
BY
ATTORNEY July 26, 1949.  A. A. VOLK  2,477,022
OPTICAL SIGNAL FOR AUTOMOBILES AND THE LIKE
Filed Feb. 21, 1947  3 Sheets-Sheet 3

INVENTOR:
ALBERT A. VOLK
BY
ATTORNEY

Patented July 26, 1949

2,477,022

UNITED STATES PATENT OFFICE 2,477,022

OPTICAL SIGNAL FOR AUTOMOBILES AND THE LIKE

Albert A. Volk, New York, N. Y.

Application February 21, 1947, Serial No. 730,013

5 Claims. (Cl. 177—327)

My invention relates to optical signals for automobiles or other vehicles and, more particularly, to signals showing illuminated signs, letters or words.

Objects of my invention are to provide one surface or area with illuminatable signs which spell different words or signals according to those signs that are illuminated at a time, to provide for illumination of some of these signs from one light source and for illumination of other signs from another light source, and to change the visibility or illumination of the signs, and consequently the signals by switching one or both light sources.

Other objects are to provide for relatively large and well readable signals arranged on an area of moderate size, to utilize substantially the same area for both alternatively used signals, and to make this possible by arranging parts of one signal between parts of the other signal.

Further objects are to provide for selective illumination of the signs or of the parts of the signals, to compose these signs of light deflecting surfaces, that is, either of reflecting or of refracting surfaces, to arrange these deflecting surfaces so that some of them deflect rays from one light source into a suitable direction and that other surfaces deflect rays from another light source in a similar direction, and to arrange two light sources at different and suitable angles with respect to the deflecting surfaces.

Still other objects are to provide for visibility of the respective signal from the front side, and to provide for visibility of the same signal from the back side or to use the back side for the accommodation of a mirror whereby the signal device serves additionally as a reflector and can take the place of the usual rear reflecting mirror.

Still further objects are to attain these results by means that have light weight, are not bulky and can be easily attached to an automobile, to provide for easy and reliable operation and change of the signals, and to co-ordinate this operation with the operation of the head-lights whereby, for example, dimmed head-lights are co-ordinated with a certain optical signal.

Still other objects and advantages will appear from the following description of exemplifying embodiments of my invention, from the appended claims and from the accompanying drawing in which:

Fig. 1 shows a front view of an illustrative embodiment of my invention, the front parts of light screens used in this embodiment being cut away along the line I—I in Fig. 3.

Fig. 2 shows a front view of the same embodiment in which all details of the letters are omitted, except the outlines of those letters which are illuminated from the upper light source.

Fig. 3 shows a cross-section of a broken off part of the same embodiment, this cross-section being taken along the line 3—3 and seen from the right side in Fig. 1.

Fig. 4 shows a top view of the same embodiment.

Fig. 5 shows a circuit for the operation of the same embodiment diagrammatically.

Fig. 6 shows a cross-section of a broken off part of a second embodiment, this cross-section corresponding to the cross-section of the first embodiment shown in Fig. 3.

Fig. 7 shows a perspective view of one of the prisms used in the second embodiment.

Figs. 3, 6, 7 and 9 are represented on a larger scale than Figs. 1, 2, 4 and 8.

Figure 10:
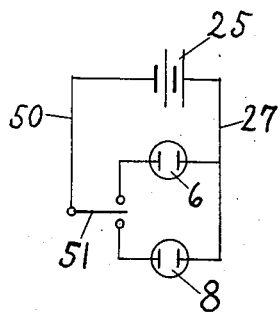
Fig. 10 shows a circuit for the operation of the third embodiment diagrammatically.

Referring to Figs. 1 to 5, numeral 2 indicates a disc or plate which may be circular and may be affixed to an automobile or other vehicle in any suitable manner, for example, in a manner similar to a rear reflecting mirror. The plate 2 has a front surface 4 which is preferably perpendicular to the moving direction of the vehicle. A mirror 5 may be affixed to or inserted in the back surface of the plate 2.

A light source or lamp 6 is positioned before the upper part of the surface 4 and is held by an arm 7 affixed to the plate 2. A similar light source 8 is positioned before the lower part of the surface 4 and is similarly held. Each of the lamps 6 and 8 is prevented from radiating to the front side by a screen 10. Each screen 10 is affixed to the plate 2 and forms a wall of a space 11 which contains one of the lamps and is open only at that side which faces the other space 11. The inner sides of the screens 10 or those surfaces of these screens which face the surface 4 are preferably reflecting. For example, these surfaces are mirror-like polished.

The screens 10 leave the median zone of the surface 4 uncovered. This uncovered zone is provided with a large number of projections, some of which are indicated by numerals 13, 14, 15, 16 and 17. These projections form parts of letters, each letter being constituted by some of these projections. Preferably, the projections constituting one letter are arranged in about vertical rows and so that the projections of each row overlap in vertical direction or in the longitudinal direction of the rows with the projections of the neighboring row. The number of rows and projections may be larger than shown, the drawing containing a restricted number for the sake of clearer representation. The projections may form integral parts of the plate 2 or may be affixed to this plate in any suitable manner.

Each of these projections has a light reflecting front surface which is obliquely positioned with respect to the vertical plane of the surface 4 in such a manner that the front surface of the projection is inclined to and receives and reflects light from one of the sources 6 and 8. For example, the surface 18 of the projection 13 and the surface 19 of the projection 14 reflect rays originating from the lamp 6 while the surface 20 of the projection 16 reflects rays from the lamp 8.

Some of the projections have front surfaces of which portions are in the shadow of vertically adjoining projections. These shadowed portions are very small because the illuminating light does not merely radiate in the plane of Fig. 3 but also in oblique directions, due to the considerable length of the light source. By providing a sufficiently large number of sufficiently small and overlapping projections, the shadowed portions are so reduced that substantially the whole area of each of these front surfaces is illuminated.

The position and inclination of the reflecting surface of each individual projection is so chosen that this surface reflects the light preferably about perpendicularly to the surface 4 or in horizontal direction to the front. For example, rays 21 and 22 originating from the lamp 6 are reflecting in the directions of the arrows 23 and 24. This result may be attained by the following arrangement: The projections reflecting light from the lamp 6 constitute a system comprising reflecting surfaces of smaller inclination and higher position and reflecting surfaces of larger inclinations and lower positions while the projections reflecting light from the lamp 8 constitute a similar system comprising reflecting surfaces of smaller inclinations and lower positions and reflecting surfaces of larger inclinations and higher positions.

The area showing the signal signs or the bodies constituting these signs define horizontal lines of visibility distributed over a cross-section reaching about from the lower edge of the upper screen 10 to the upper edge of the lower screen 10. The lamps 6 and 8 are positioned laterally with respect to these lines, the lamp 6 above these lines, the lamp 8 under these lines. Both lamps have a distance from the area of the signal signs or from the reflecting surfaces in that direction that is parallel to the lines of visibility whereby rays radiating from the lamps hit this area or the reflecting surfaces angularly.

The light sources 6 and 8 are electrically operated bulbs or tubes, for example, glow discharge tubes or neon lamps of considerable horizontal length. These light sources are supplied with current by a circuit which is schematically shown in Fig. 5 and comprises a current source 25 the poles of which are connected by wires 26 and 27 to the poles of the tubes 6 and 8. The connection with the tube 8 can be interrupted by opening a switch 28.

When the switch 28 is closed, both lamps 6 and 8 radiate and, consequently, all parts of the letters are illuminated whereby these letters spell "DAM" as to be seen in Fig. 1. When the switch 28 is open, only the lamp 6 radiates and only those parts of the letters are illuminated that reflect light from this lamp while a part of the letter "A" is blacked out. Thereby, the illuminated parts spell "DIM" as shown in Fig. 2. The operation of the switch 28 may be co-ordinated with other operations of the driver, for example, with the switching of the head-lights. Preferably, the switch 28 is a part of or is connected to the dim-out pedal whereby the switch 28 opens automatically when the head-lights are dimmed. Thereby, the signal "DIM" serves notice to any meeting driver, that the head-lights are dimmed and that he too is requested to dim his head-lights.

Fig. 6 belongs to another embodiment of my invention. This second embodiment differs from the first described embodiment in that the light radiated from the light sources is deflected by refracting and not by reflecting surfaces. The plate 32 which may be positioned and affixed to a vehicle in similar manner as the plate 2 of the first embodiment has openings with outlines forming letters similar to the letters of the first embodiment. Transparent bodies or prisms, some of which are indicated by 33, 34, 35, 36 and 37, pass through these openings and are affixed to each other and to the plate 32. Each prism forms a part of a letter, the letters being divided into rows of overlapping parts in a manner similar to the division of the letters of the first embodiment.

All parts of the second embodiment, except the parts constituting the letters, are substantially identical to the corresponding parts of the first embodiment, provided that front and back exchange their positions. Figs. 4 and 5 apply also to the second embodiment. The back view of the second embodiment is similar to the front view of the first embodiment shown in Figs. 1 and 2, except that the elements 33 to 37 take the places of the elements 13 to 17 and that, seen from the back side, the letters, of course, must be formed so as they appear in a mirror in order to be read correctly from the front side.

Each of the prisms has two refracting surfaces meeting in a horizontal edge positioned behind the back surface of the plate 32. For example, the prism 33 has a back surface 38 and a front surface 39. The surface 38 and the corresponding surfaces of the other prisms receive light from either of the lamps 6 and 8 in a manner similar to the reflecting surfaces of the projections in the first embodiment. A substantial part of this light passes through the respective prism and leaves the same through the front surface in a deflected direction. The position of the prisms with respect to the illuminating light source and the angles between the co-operating refracting surfaces are so measured that the prevailing leaving direction of the light rays points horizontally to the front or in similar direction as in the first embodiment.

This result is obtained, for example, in the following manner: The prisms illuminated by the lamp 6 form a system comprising back surfaces inclined to or obliquely facing the lamp 6 and front surfaces positioned at slightly different angles to the back surfaces, these angles varying from the bottom to the top of the letters. The prisms illuminated by the lamp 8 form a similar system comprising refracting surfaces positioned symmetrically to the corresponding surfaces of the first system with respect to that horizontal plane which has equal distances from the two lamps.

For example, rays 40 and 41 are deflected in the directions of the arrows 42 and 43.

Figure 9:
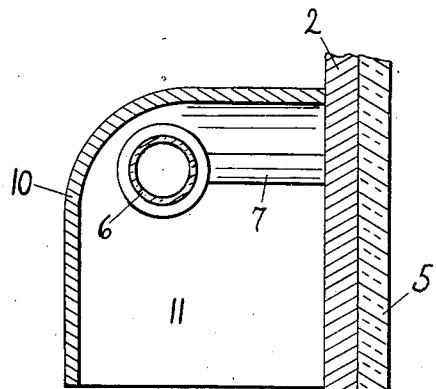
Fig. 9 shows a cross-section taken along the line 9—9 in Fig. 8.
Figure 8:
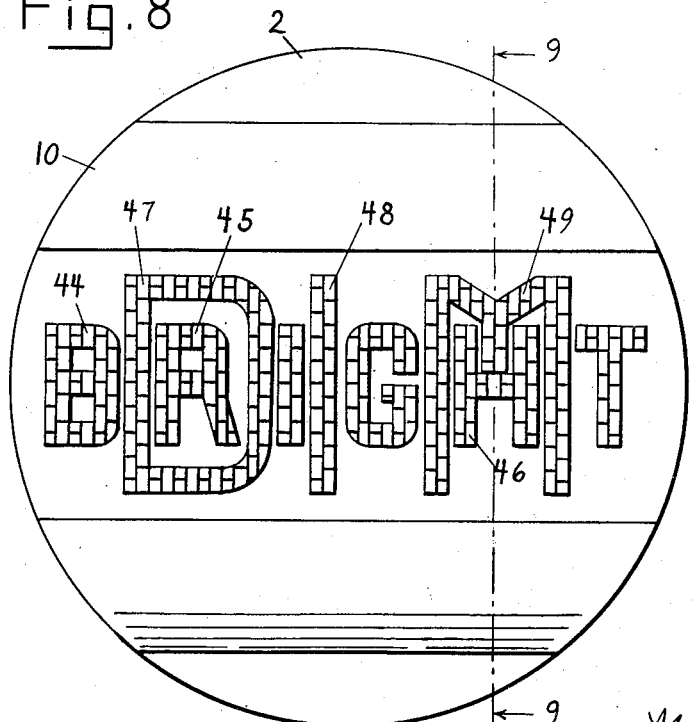
Fig. 8 shows a front view of a third embodiment.

Figs. 8, 9 and 10 illustrate a third embodiment. Fig. 4 applies also to this embodiment. The third embodiment differs from the first and second embodiments in that all parts of one signal are illuminated by one light source and all parts of the other signal are illuminated by the other light source and that, in accordance therewith, the light sources are operated alternatingly while, in the two embodiments described before, one light source is operated in both cases of different signals. With exception of the arrangement of the letters and of the circuit, the third embodiment may be identical, for example, to the first embodiment. Similar projections, reflecting surfaces and so on may be used.

In the third embodiment, the surfaces deflecting light from the source 8 form letters some of which are indicated by 44, 45 and 46. For example, these letters spell the word "BRIGHT." The deflecting surfaces dependent on the source 6 form letters 47, 48 and 49 which may, for example, spell the word "DIM." All letters are distributed over substantially the same area, the letters or parts of the letters of one word or signal being placed between letters or parts of letters of the other word or signal. Thereby it is possible to make one signal independent from the spelling of the other signal and to use, alternatingly, two signals having no common parts.

The circuit shown in Fig. 10 is identical to the circuit shown in Fig. 5, except that instead of the wire 26 and the switch 28, a wire 50 and a switch 51 is used. The wire 50 connects one pole of the current source 25 to the switch 51. This switch connects the wire 50 either to the tube 6 or to the tube 8. The operation of the switch 51 may be co-ordinated with the operation of the dim-out pedal in a manner corresponding to the co-ordination of the switch 28.

I desire it understood that my invention is not confined to the particular embodiments shown and described, the same being merely illustrative, and that my invention may be carried out in other ways without departing from the spirit of my invention as it is obvious that the particular embodiments shown and described are only a few of the many that may be employed to attain the objects of my invention.

Having described the nature of my invention, what I claim and desire to protect by Letters Patent is:

1. A signal device for an automobile or other vehicle, said device comprising a plurality of bodies forming signs distributed over an area visible from the front, two light sources positioned in different lateral directions out of lines of said visibility and having a distance from said area in the direction of said visibility, some of said bodies having light deflecting surfaces inclined toward one of said light sources, some other of said bodies having light deflecting surfaces inclined toward the other light source, and means to switch off one of said light sources.

2. A signal device for an automobile or other vehicle, said device comprising a plate extending across the moving direction of the vehicle, a plurality of projections extending from said plate to the front and forming signs distributed over an area visible from the front, two light sources positioned in front of said area and in different lateral directions out of the lines of said visibility, some of said projections having light reflecting surfaces inclined toward one of said light sources, some other of said projections having light reflecting surfaces inclined toward the other light source, and means to switch off one of said light sources.

3. A signal device for an automobile or other vehicle, said device comprising a plate extending across the moving direction of the vehicle, a plurality of projections extending from said plate to the front and forming signs distributed over an area visible from the front, two light sources positioned in front of said area and in different lateral directions out of the lines of said visibility, some of said projections having light reflecting surfaces inclined toward one of said light sources, some other of said projections having light reflecting surfaces inclined toward the other light source, the inclination of each of said reflecting surfaces being so measured that said surfaces reflect the light in about horizontal directions, and means to switch off one of said light sources.

4. A signal device for an automobile or other vehicle, said device comprising a plurality of bodies forming a signal consisting of signs distributed over an area visible from the front, a plurality of other bodies forming additional signs positioned in the same area and adapted to change said signal to a different signal, two light sources positioned in different lateral directions out of the lines of said visibility and having a distance from said area in the direction of said visibility, the bodies forming said first signal having light deflecting surfaces inclined toward one of said light sources, the bodies forming said additional signs having light deflecting surfaces inclined toward said other light source, and means to operate, optionally, either both light sources or said first light source alone.

5. A signal device for an automobile or other vehicle, said device comprising a plurality of bodies forming signs distributed over an area visible from the front, each sign comprising parallel rows of said bodies, the bodies of one row overlapping in longitudinal direction of the row with the bodies of a neighboring row, two light sources positioned in different lateral directions out of the lines of said visibility and having a distance from said area in the direction of said visibility, some of said bodies having light deflecting surfaces inclined toward one of said light sources, some other of said bodies having light deflecting surfaces inclined toward the other light source, and means to switch off one of said light sources.

ALBERT A. VOLK.

REFERENCES CITED

The following references are of record in the file of this patent:

UNITED STATES PATENTS

| Number | Name | Date |
| --- | --- | --- |
| 1,322,776 | Foster et al. | Nov. 25, 1919 |
| 1,353,253 | Livingston et al. | Sept. 21, 1920 |
| 1,514,653 | Cardwell | Nov. 11, 1924 |
| 1,874,138 | Stimson | Aug. 30, 1932 |